J. L. MOTT.
Magazine Stove.
RX No. 83.
Reissued Aug. 8, 1846.
7910X Related Doc
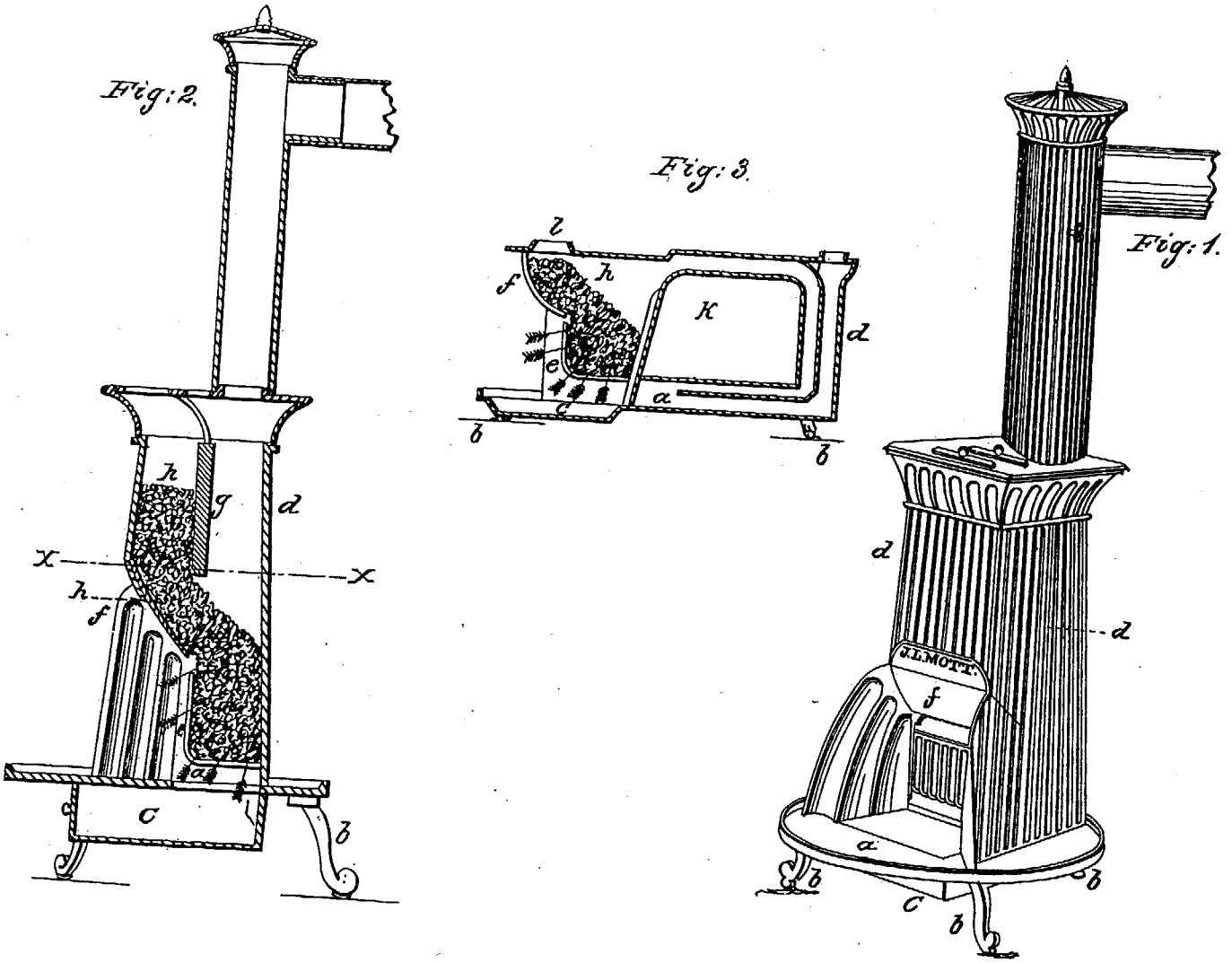

UNITED STATES PATENT OFFICE.

Rx 83

JORDAN L. MOTT, OF NEW YORK, N. Y.

IMPROVEMENT IN STOVES.

7910X RELATED DOC

Specification forming part of Letters Patent dated December 30, 1833; Reissue No. 83, dated August 8, 1846.

*To all whom it may concern:*

Be it known that I, JORDAN L. MOTT, of the city, county, and State of New York, have invented a new and useful Improvement in Stoves; and I do hereby declare that the following is a full, clear, and exact description of the principle or character which distinguishes it from all other things before known, and of the manner of making, constructing, and using the same, reference being had to the accompanying drawings, making part of this specification, in which—

Figure 1 is a perspective view of my stove, and Fig. 2 a vertical section.

The same letters indicate like parts in both figures.

By a series of experiments I ascertained, what is now universally admitted to be true, that to obtain the maximum amount of heat from anthracite coal when disintegrated it must be exposed in given thickness to the action of a current or currents of atmospheric air passing through the mass, the thickness of the stratum to be governed by the size of the lump and the volume and intensity of the current of air, for if the stratum be too thin, the oxygen of the air in passing through will not take up its equivalent of carbon evolved in an amount of heat below that due to the bulk of air, and therefore the mass is gradually cooled down below the point of ignition, and in a short time the fire is extinguished, leaving the coal with only the external coat burned and the inside unconsumed, but wasted on account of the cinder. If, however, the stratum be too thick, the oxygen of the air passing through the under part of stratum takes its equivalent of carbon, producing carbonic-acid gas, the result of a perfect combustion, and evolving the greatest amount of heat, and in passing through the upper part of stratum of coal takes up another proportion of carbon, changing the carbonic-acid into carbonic oxide gas, the production of which absorbs heat, thus not only absorbing a portion of the heat evolved by the perfect combustion, but at the same time carrying off in the form of a gas a large portion of combustible matter. My early experiments were, however, unsatisfactory, as they were conducted with large or broken coal, which ignites too slowly. My attention was then turned to the use of small or what was then termed "refuse" coal, which was accumulating in large quantities at the mines and coal-yards, and deemed to be of little value. As it was known to be necessary to reduce the size of wood to obtain a rapid combustion, I reasoned that like means would produce like results with coal. On this hypothesis I experimented with a close stove having a horizontal grate, and found that with a thick stratum combustion was slow, the process of ignition tedious, and the draft sluggish, owing to the smallness of the interstices, which were soon closed up by ashes, but that, on the contrary, with a thin stratum ignition was rapid and combustion active in a short time, soon requiring the charge to be replenished at the cost of constant attention. The common grate used at the time of my experiments, either in open or closed fire-places or stoves, did not afford the means of avoiding these imperfect results, and my object was to contrive an apparatus in which these kinds of fuel could be burned with more economy and facility. It was therefore necessary to contrive an apparatus which would receive a sufficiently large charge of fuel to avoid the necessity of constant attention, and which would continue to supply the necessary quantity where combustion would be required, and to do this without the necessity of a constant attention. This had been essayed without success by means of what was termed a "feeding-chamber" placed vertically above the grate; but it soon became obvious that this did not meet all the demands, for the coal which is fully ignited should be in a thicker stratum than when it is only partly ignited, as the latter will give out more carbon than the former, and, besides, if the charge of coal be directly above the grate it necessarily cuts off the action of much of the heat evolved from the stove-plates or apartment to be heated. My object was so to combine a feeder with a grate as to supply the coal regularly to the grate by its gravity, and to have the whole charge in these divisions, but by imperceptible gradations, the coal in the feeder undergoing the distilling process to be prepared for the grate, and while undergoing this preparation gradually descending to the forward part of the grate, where it would present a thin stratum for the passage of the current of air for its combustion, and thence to be transferred to the back of the grate, where in a nearly-consumed state it would present a thicker stratum for the passage of the air. All these conditions I have attained without intercepting the action of the heat of either the ignited coal or the flames by placing the feeder, which receives the charge of coal, above and forward of the grate, so that it shall gradually descend therefrom into the grate in an inclined direction, the upper surface of the coal from the feeder to the back of the grate presenting an inclined plane, while the lower surface increases in depth by the depth of the front of the grate from the feeder to the bottom of the grate.

In the accompanying drawings, Figure 1 is a perspective view of an ornamental stove in the form of a parallelopiped or frustum of a pyramid of any required dimensions, and Fig. 2 a vertical section thereof through the grate and feeder; and Fig. 3 is a vertical section of a cooking-stove with my improvement applied to it.

The bottom plate, *a*, of this stove may stand on feet *b*, to leave a sufficient space for the ash-pan *c*. The external case is formed by the plates *d*. The grate *e*, with bottom and front bars, may be made in the usual manner. From the top of the front bars of the grate, or a little above it, a shelf, *f*, which also serves as a permanent blower for the coal lying on and above it, runs forward and up in a curved line to the front plate, and back of this front plate there is another plate, *g*, which extends down from the top to within such a distance of the lower edge of the shelf *f* as to regulate the thickness of the stratum of coal which passes off from the feeding-chamber *h*, thus formed, to the grate, and as the coal or other fuel to be burned is in lumps, it is manifest that in passing this gage-plate *g* it will run down to the back of the grate, forming an inclined plane, so that the current of air passing through the upper part of the front grates in the direction of the black arrows passes through a thinner stratum of coal than that which passes through the lower part of the grate in the direction of the red arrows. In this way the required bulk of coal is always retained in the grate and properly distributed for keeping up the most perfect, regular, and economical combustion, for the heat of the fire in the lower grate distills the coal in the lower part of the feeder, evolving carbureted hydrogen, which is inflamed by meeting portions of oxygen that have passed without taking up their equivalents of carbon in passing through the mass of coal in the grate, and as the coal in the bottom and back of the grate is gradually consumed, the mass gradually sinks, receiving a constant and gradual supply from the feeder in a prepared state for keeping up the combustion.

The coal is supplied to the feeding-chamber through a hole at top provided with a cover.

The gage-plate *g* is not necessary, except when the feeding-chamber is made of great capacity and height, as will appear by imagining the top plate of the stove to be at the horizontal line X X of Fig. 2, merely reducing the height of the stove.

In Fig. 3, which represents my improvement applied to a cooking-stove with the oven *k* back of the grate, the shelf *f* extends from a little above the top of the grate to the top plate of the stove, with an aperture, *l*, provided with a cover, for in this the gage is not necessary, the feeding or preparatory chamber being of smaller capacity than in the stove first described. The shelf of the feeder may be more or less curved or inclined at pleasure, or, in fact, it may be horizontal with a front plate; but in this latter it will be obvious that a portion of the coal will remain in the angular space formed by the junction of the shelf and front plate. In short, the feeder can be made of any desired form or structure, provided it be placed above and extending forward of the grate, which (the grate) must also be made to extend down below the projection of the curved line of the shelf to give the required depth of coal, as I found by experiment that if the bottom of the grate is made in continuation of the curve or inclination of the shelf of the feeder the desired objects could not be obtained.

It will be obvious that the grate may be inclosed by plates or doors, provided there be space enough left between them and the grate for the passage of air. It will also be obvious that the grate and shelf may be cast in one piece, and that the lower or inner edge of the shelf may be made to project a short distance within the grate without materially affecting the results, as these various changes and many others not necessary to enumerate can be made within the principle of my invention.

I do not claim, simply, the employment of a feeder or chamber of preparation; but What I do claim as my invention, and desire to secure by Letters Patent, is—

The method, substantially as herein described, of combining a chamber of preparation for the coal presenting the characteristics herein described with a grate placed below and back of it or the principal part thereof, whereby the coal is prepared by distillation and regularly supplied by gravity to the grate as combustion progresses in the proper condition to produce a regular, constant, and economical combustion, the coal in the feeder undergoing a distilling process and that in the upper part of the grate presenting a thinner stratum for the passage the of air than that in the bottom and back of the grate, which is undergoing the last stages of combustion, as herein described, and this I claim whether the chamber of preparation or feeder be extended high enough to require the guard-plate or gager or made so low as to dispense with the guard-plate, as herein fully set forth.

JORDAN L. MOTT.

Witnesses:
A. P. BROWNE,
DAVID HINMAN.